(12) United States Patent
 Vila Papell

(10) Patent No.: US 8,914,153 B2
(45) Date of Patent: Dec. 16, 2014

(54) HEAD FOR POSITIONING A TOOL ON IRREGULAR SURFACES

(75) Inventor: Enric Vila Papell, Valldoreix (ES)

(73) Assignee: Estudios de Ingenieria Adaptada, S.L., Pamplona (Navarra) (ES)

( * ) Notice: Subject to any disclaimer, the term of this patent is extended or adjusted under 35 U.S.C. 154(b) by 707 days.

(21) Appl. No.: 13/055,069

(22) PCT Filed: Jul. 23, 2009

(86) PCT No.: PCT/ES2009/000387
§ 371 (c)(1),
(2), (4) Date: Jan. 20, 2011

(87) PCT Pub. No.: WO2010/010214
PCT Pub. Date: Jan. 28, 2010

(65) Prior Publication Data
US 2011/0130878 A1    Jun. 2, 2011

(30) Foreign Application Priority Data

Jul. 23, 2008  (ES) .................................. 200802192

(51) Int. Cl.
*G05B 15/00*    (2006.01)
*G05B 19/00*    (2006.01)
*B25J 9/16*    (2006.01)

(52) U.S. Cl.
CPC ..................... *B25J 9/1684* (2013.01)
USPC ........................................................ 700/258

(58) Field of Classification Search
USPC ....................................................... 700/258
See application file for complete search history.

(56) References Cited

U.S. PATENT DOCUMENTS

| 4,310,958 | A | * | 1/1982 | Balaud et al. ................. 29/26 A |
| 4,531,192 | A | * | 7/1985 | Cook ............................. 700/258 |
| 4,611,377 | A | * | 9/1986 | McCormick et al. ....... 29/407.05 |
| 4,823,618 | A | * | 4/1989 | Ramming ................ 73/862.045 |
| 5,077,941 | A | | 1/1992 | Whitney |
| 5,331,770 | A | | 7/1994 | Ichinohe et al. |
| 5,509,848 | A | | 4/1996 | Shimbara |
| 5,715,375 | A | * | 2/1998 | Ito et al. ......................... 700/258 |
| 6,317,653 | B1 | * | 11/2001 | Kamiya ......................... 700/260 |
| 6,525,294 | B1 | * | 2/2003 | Kipping et al. ........... 219/121.63 |
| 6,795,750 | B2 | * | 9/2004 | Kullborg ....................... 700/245 |
| 7,110,859 | B2 | * | 9/2006 | Shibata et al. ............... 700/245 |
| 2001/0045413 | A1 | * | 11/2001 | Suita ......................... 219/86.51 |
| 2003/0060929 | A1 | * | 3/2003 | Kullborg ....................... 700/245 |
| 2006/0181236 | A1 | * | 8/2006 | Brogardh ................... 318/568.1 |
| 2006/0288550 | A1 | * | 12/2006 | Johansson ......................... 29/53 |

FOREIGN PATENT DOCUMENTS

| CA | 582993 A | 9/1959 |
| ES | 2183336 T3 | 3/2003 |
| JP | 63047058 A | 2/1988 |

* cited by examiner

*Primary Examiner* — Bhavesh V Amin
(74) *Attorney, Agent, or Firm* — Lucas & Mercanti, LLP

(57) ABSTRACT

The invention relates to a head for positioning a tool on irregular surfaces, formed by a tool-holder assembly which is coupled to a robot arm (4) by means of a support (3), the tool-holder assembly being provided with a force sensor (2) and distance detectors (7) by means of which a control of the action of the robot arm (4) for positioning the work tool with respect to the operating surface is established.

4 Claims, 5 Drawing Sheets

HEAD FOR POSITIONING A TOOL ON IRREGULAR SURFACES

This is a U.S. National Phase Application under 35 U.S.C. 371 of International Application PCT/ES2009/000387, filed on Jul. 23, 2009, which claimed the priority of Spanish application No. P 200802192, filed Jul. 23, 2008, the entire content of both applications are hereby incorporated by reference.

TECHNICAL SECTOR

The present invention relates to automating work on large surfaces for cleaning, polishing or similar operations, proposing a head intended for being coupled to a robot and which is capable of continuously controlling the position of the tool, adapting it with respect to the working surface, allowing operation on that the entire surface in suitable conditions to obtain an efficient work, without the need of establishing a specific programming of the surface.

PRIOR ART

There is a need to perform surface works of cleaning, polishing, etc., upon large parts which generally have an irregular surface in certain sectors, such as the aeronautic sector, wind energy sector, and other similar sectors, therefore robotic work programming is very complicated, generally causing said work to be performed manually with the cost and human risk drawbacks that it entails.

OBJECT OF THE INVENTION

According to the invention a tool-holder head for performing surface works by means of a robot, with features that allow automatically adapting the position of the tool to constantly maintain it in the suitable working position with respect to the application surface is proposed.

This head object of the invention has a tool-holder plate that is coupled, by means of a force sensor, with respect to a support for coupling to a robot arm, said tool-holder plate centrally incorporates a ball joint by means of which a work disk-tool is supported, allowing a variation of the inclination position of said disk-tool adapting it to the working surface.

An arrangement is thus obtained, whereby the force sensor controls the stress that the disk-tool exerts on the working surface, generating information that is applied to the control of the robot arm in relation to the operative thrust, so that the force of the disk-tool on the working surface is maintained constant.

Distance detectors which control the relative position between said tool-holder plate and the disk-tool are further incorporated in the tool-holder plate, generating in turn information that is applied to the control of the robot arm, for correcting the positioning, such that the head is maintained perpendicular with respect to the working surface.

The tool-holder plate incorporating multiple disk-tools, whereby covering a greater surface by means of partial areas on the working surface is provided in a practical embodiment; the tool-holder plate being fastened in an articulated manner to the support for coupling to the robot arm and supported on an actuator cylinder which operates according to the pressure of the support against the mentioned support for coupling to the robot; such that according to the distribution of the force of the different disk-tools on the working surface, said actuator cylinder determines the position of the tool-holder plate so that all the disk-tools exert equal force on the working surface.

The tool can also be of a type that does not establish physical contact with the working surface, such as a laser, a thermographic camera, etc., the distance detectors controlling the relative position of the support for coupling to the robot, with respect to the working surface, to determine an action of varying the position such that the tool used constantly strikes each area of the mentioned working surface perpendicularly.

Therefore, the head of the invention leads to absolutely advantageous features for the application for which it is intended, acquiring its own identity and preferred character for automated working on irregular surfaces.

DETAILED DESCRIPTION OF THE INVENTION

Figure 1:
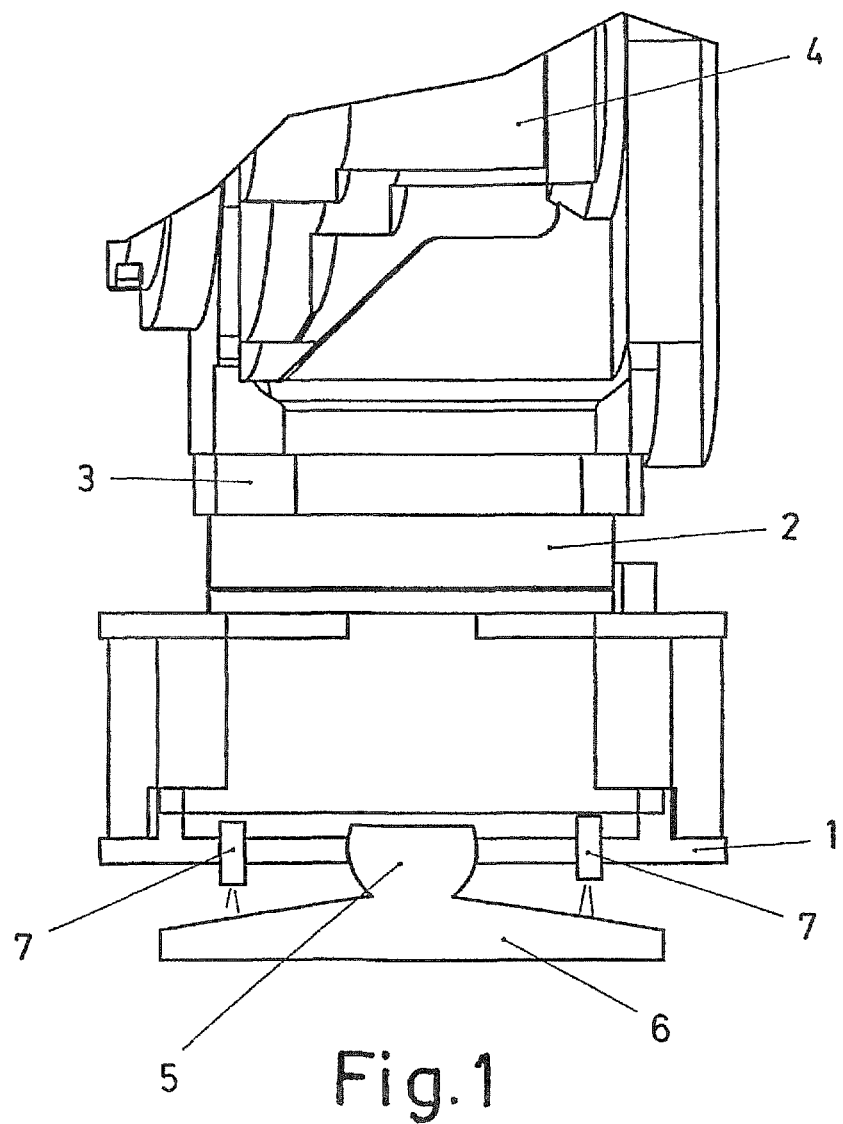
FIG. 1 shows a schematic view of the head object of the invention.
Figure 2:
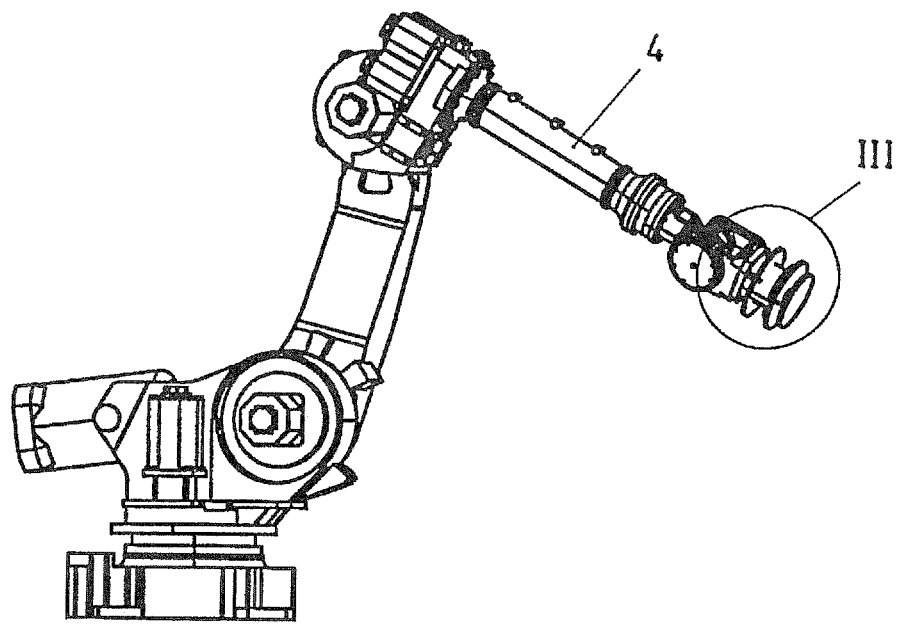
FIG. 2 is a perspective view of said head of the invention in an application on the end of a robot arm.
Figure 3:
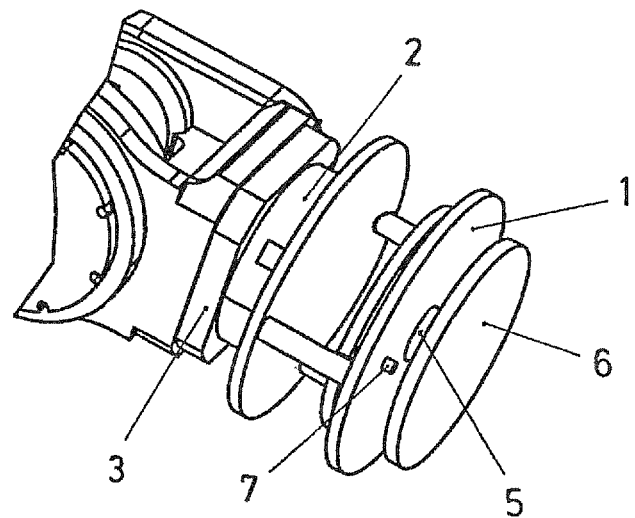
FIG. 3 is an enlarged view of the area III indicated in the previous figure.

The object of the invention relates to a tool-holder head to perform work in a robotic manner on irregular surfaces, with an embodiment which allows adapting the position of the tool according to the configuration of each area of the working surface, to carry out works precisely and effectively.

The head comprises a plate (1) which is attached, by means of a force sensor (2), to a support (3) for coupling to a robot arm (4).

The plate (1) further has a ball joint (5) in the center on which a disk-tool (6) is attached, which disk-tool can vary the position up to an inclination of 15° by means of the mentioned ball joint (5) for adapting it to the working surface.

Distance detectors (7) which control the position of the disk-tool (6) from different points with respect to the mentioned plate (1) are also arranged in the plate (1).

Thus when the disk-tool (6) is supported on a working surface, the force sensors (2) control the force of said support, generating information that is applied to control the robot arm (4), correcting the thrusting force thereof so that the supporting force of the disk-tool (6) on the working surface is maintained constant.

In addition, the distance detectors (7) control the position of the disk-tool (6), generating in turn information that is also applied to control the robot arm (4), which based on said information corrects the positioning so that the head is maintained perpendicular with respect to the working surface.

Figure 5:
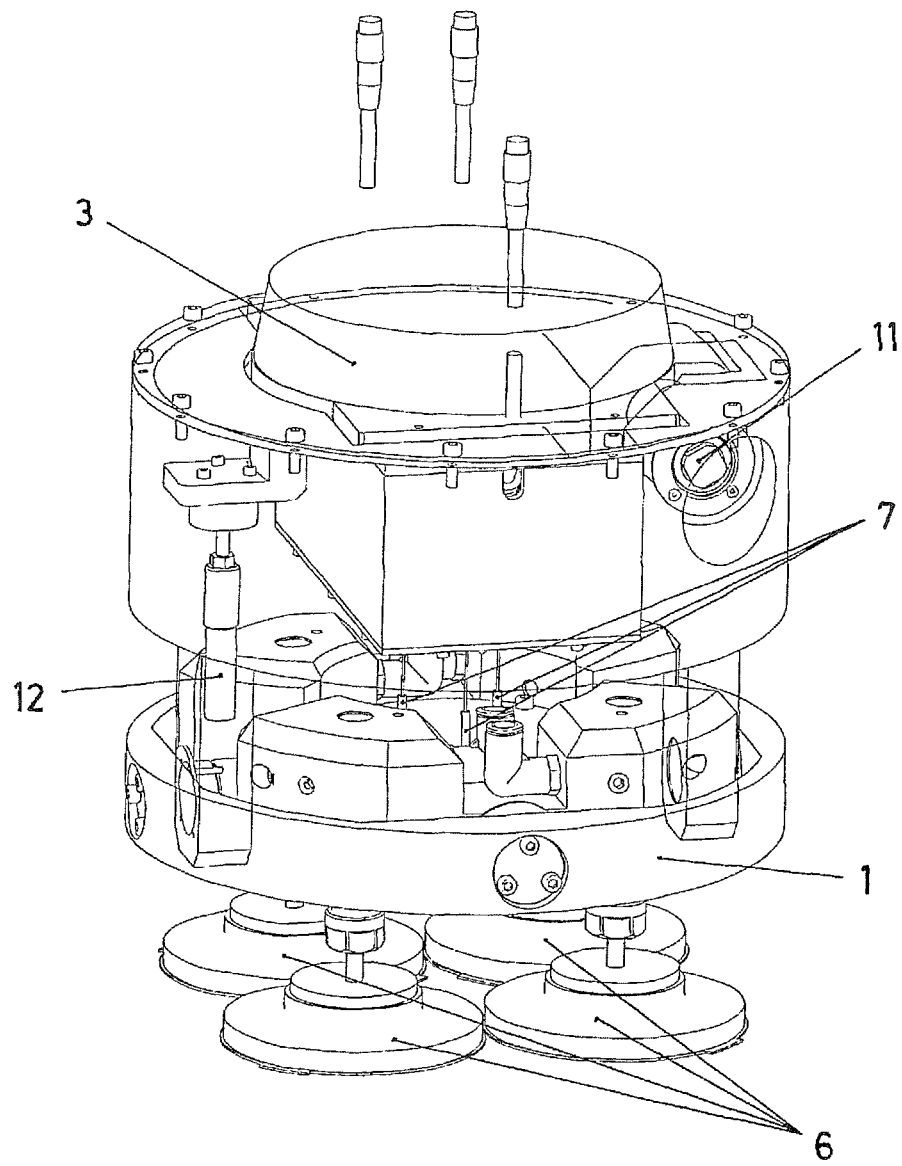
FIG. 5 is a perspective view of the head according to an embodiment with multiple disk-tools and the tool-holder plate is attached in an articulated manner to the support for coupling to the robot arm.
Figure 6:
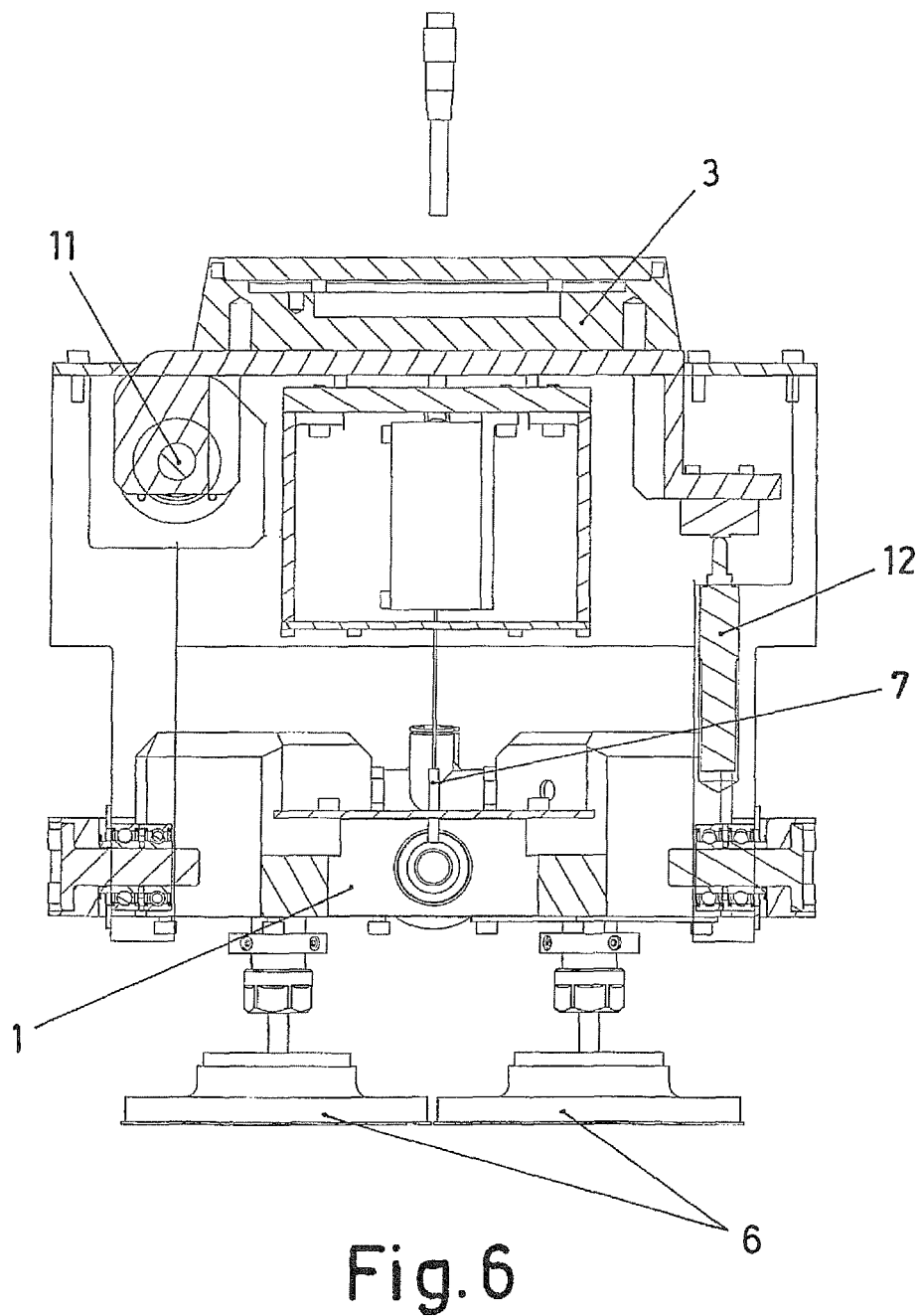
FIG. 6 is a sectional view of the head according to the embodiment of the previous figure.

According to one embodiment (FIGS. 5 and 6) multiple disk-tools (6) are arranged in the plate (1), by means of which a larger surface is covered, in partial areas, on the working surface.

In addition, said plate (1) with multiple disk-tools (6) is attached to the support (3) by means of an articulation (11), with respect to which it can swing varying inclination, said plate (1) being supported on an actuator cylinder (12) operating according to the pressure of the support that acts on it.

In this manner, when the distribution of pressure of the disk-tools (6) on the working surface is not uniform due to the irregularities of that working area in the operating area, the actuator cylinder (12) acknowledges that circumstance, correcting the position of the plate (1), making it swing on the articulation (11) so that the pressure of the disk-tool (6) assembly is uniform on the working surface, such that the actuation of all of them results in the same effect as the action on the working surface.

Figure 4:
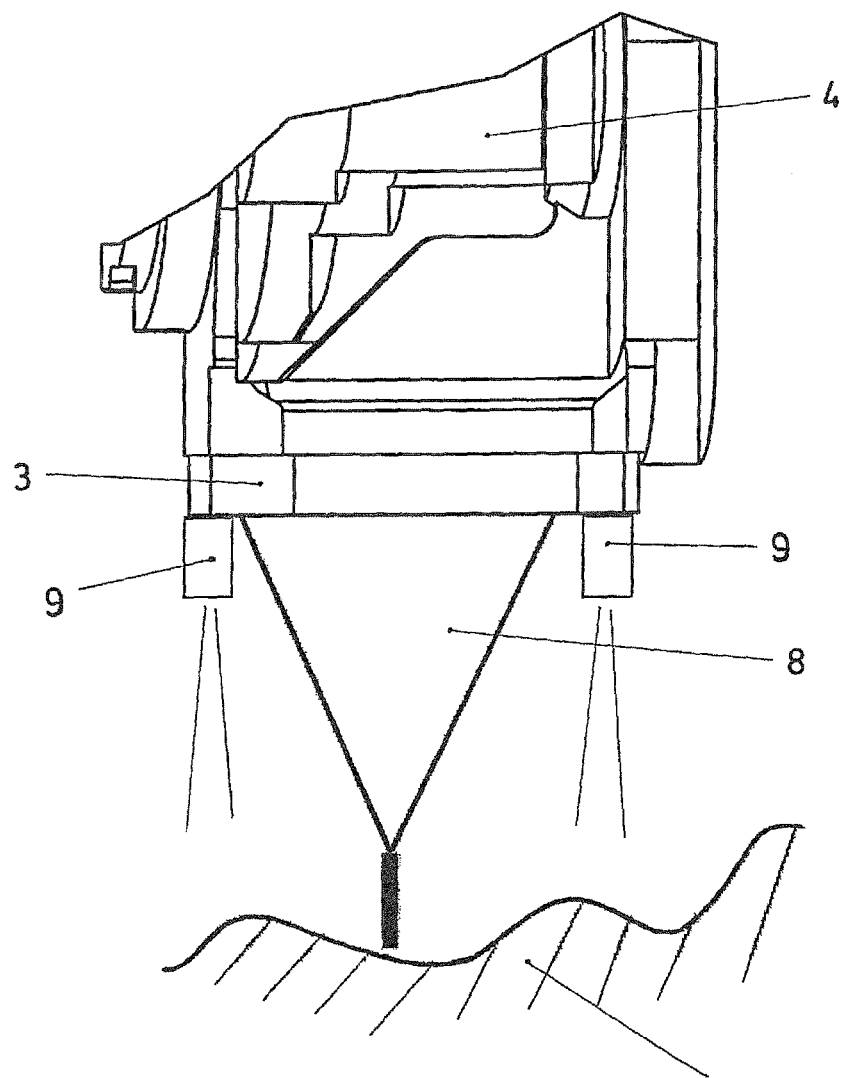
FIG. 4 shows an example of application for adapting the working position of a tool with no physical contact with the working surface, according to the concept of the invention.

The concept of control for adapting the working position of a tool according to the configuration of the working surface according to the object of the invention also applies for tools (8) that do not establish physical contact with the working surface, such as a laser, a thermographic camera, etc., as shown in FIG. 4.

In this case the tool (8) not contacting the working surface is arranged on the support (3) for coupling to the robot arm (4), with distance detectors (9) arranged in said support (3) for controlling the position thereof from different points with respect to the corresponding working surface (10) such that by means of the information provided by said distance detectors (9), the position is corrected by means of the robot arm (4) so that the tool (8) strikes perpendicularly on the operating area in the mentioned working surface (10) and at a constant distance.

The invention claimed is:

1. A head for positioning a tool on irregular surfaces, for performing a robotic tracking of a work tool on irregular surfaces comprising a tool-holder assembly having a support for coupling to a robot arm, said tool-holder assembly being provided with a force sensor and distance detectors, by means of which a control determining the positioning of the work tool with respect to the operating surface is established,
wherein the tool-holder assembly has a tool-holder plate which is attached by means of the force sensor with respect to the support for coupling to the robot arm, the tool-holder plate centrally incorporating a ball joint and a distribution of distance detectors arranged around it, a disk-tool being attached to the ball joint, which disk-tool is adapted to the working surface due to the play afforded by the mentioned ball joint, varying the force and position of the thrust thereof on the working surface by means of the robot arm according to the information provided by the force sensor and distance detectors.

2. The head for positioning a tool on irregular surfaces according to claim 1, wherein the information provided by the force sensor and distance detectors is applied to control the robot arm in tracking the work on the operating surface.

3. A head for positioning a tool on irregular surfaces, comprising a tool-holder assembly having a support for coupling to a robot arm, said tool-holder assembly being provided with distance detectors mounted on the support, by means of which a control determining the positioning of the work tool with respect to the operating surface is established, wherein a tool separated by a distance from the working surface can be directly incorporated on the support for coupling to the robot arm, distance detectors by means of which a control with respect to the corresponding working surface is determined being arranged on the support in order to place the tool perpendicular to the working surface and at a constant distance.

4. A head for positioning a tool on irregular surfaces, for performing a robotic tracking of a work tool on irregular surfaces comprising a tool-holder assembly having a support for coupling to a robot arm, said tool-holder assembly being provided with a force sensor and distance detectors, by means of which a control determining the positioning of the work tool with respect to the operating surface is established, wherein the tool-holder assembly has a tool-holder plate on which multiple disk tools are incorporated, said tool-holder plate being attached in articulation with respect to the support for coupling to the robot arm and supported on an actuator cylinder operating to correct the position of the mentioned tool-holder plate, according to the distribution of the supporting force of the different disk-tools on the working surface.

* * * * *